United States Patent
Enomoto (10) Patent No.: US 9,537,312 B2
(45) Date of Patent: Jan. 3, 2017

(54) COGENERATION APPARATUS

(71) Applicant: HONDA MOTOR CO., LTD., Minato-Ku, Tokyo (JP)

(72) Inventor: Takayuki Enomoto, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 542 days.

(21) Appl. No.: 14/079,700

(22) Filed: Nov. 14, 2013

(65) Prior Publication Data

US 2014/0139028 A1  May 22, 2014

(30) Foreign Application Priority Data

Nov. 16, 2012  (JP) .................. 2012-252733

(51) Int. Cl.
*H02J 3/00* (2006.01)
*H02J 9/06* (2006.01)
*H02J 9/08* (2006.01)

(52) U.S. Cl.
CPC .................. *H02J 3/00* (2013.01); *H02J 9/061* (2013.01); *H02J 9/08* (2013.01); *Y02E 20/14* (2013.01); *Y10T 307/636* (2015.04)

(58) Field of Classification Search
CPC ............... H02J 3/00; H02J 9/08; H02J 9/061; Y10T 307/636; Y02E 20/14
USPC .......................................................... 307/68
See application file for complete search history.

(56) References Cited

U.S. PATENT DOCUMENTS

| | | | | |
|---|---|---|---|---|
| 5,198,698 A * | 3/1993 | Paul | ............................ | H02J 9/08 307/46 |
| 6,198,176 B1 * | 3/2001 | Gillette | ..................... | H02J 9/08 307/64 |
| 2001/0039941 A1 * | 11/2001 | Yamada | ................... | F02P 17/12 123/406.14 |
| 2009/0045626 A1 * | 2/2009 | Yuri | ......................... | F24D 5/04 290/2 |
| 2009/0125207 A1 * | 5/2009 | Nomura | .................... | F02C 3/22 701/100 |

(Continued)

FOREIGN PATENT DOCUMENTS

| | | |
|---|---|---|
| JP | 2001-211570 A | 8/2001 |
| JP | 2008-206264 A | 9/2008 |

OTHER PUBLICATIONS

Extended European Search Report issued on Apr. 15, 2014 on the corresponding EP Patent Application 13190254.6.

*Primary Examiner* — Jared Fureman
*Assistant Examiner* — Emmanuel R Dominique
(74) *Attorney, Agent, or Firm* — Carrier Blackman & Associates, P.C.; Joseph P. Carrier; William D. Blackman (57) ABSTRACT

In a cogeneration apparatus having a power generation unit connected to an AC power feed line between a commercial power source and electric load, and an internal combustion engine, a switch is installed between the power generation unit and an outage power output, and the switch is opened to combine the power generation unit with the commercial power source to supply combined power to the electric load if a calculated total engine operation time period is not more than a predetermined time period when the outage is determined not to occur, while the switch is closed to connect the power generation unit to the outage power output, if the power generation unit is determined to be capable of generation power based on an estimated degree of deterioration of the unit when the outage is determined to occur.

20 Claims, 6 Drawing Sheets (56) References Cited

U.S. PATENT DOCUMENTS

| | | | |
|---|---|---|---|
| 2010/0241322 A1* | 9/2010 | Miyanoo | F16H 61/66272 |
| | | | 701/54 |
| 2011/0077841 A1* | 3/2011 | Minami | F02D 41/1402 |
| | | | 701/104 |
| 2012/0133313 A1* | 5/2012 | Xie | B60W 20/00 |
| | | | 318/473 |
| 2013/0073174 A1* | 3/2013 | Worden | F02D 41/22 |
| | | | 701/102 |

* cited by examiner

COGENERATION APPARATUS

BACKGROUND OF THE INVENTION

Field of the Invention

Embodiments of this invention relate to a cogeneration apparatus having a power generation unit equipped with an engine-driven generator connected to an AC power supply line between a commercial power source and an electric load for supplying power to the load in interconnection with the commercial power source.

Description of the Related Art

In the cogeneration apparatus mentioned above, when outage occurs in the commercial power supply source, power supply from the apparatus to the commercial power source is interrupted, and AC power generated by the generator is supplied to the electric load, as taught, for example, by Japanese Laid-Open Patent Application No. 2008-206264.

SUMMARY OF THE INVENTION

Since it is in an emergency state if a power outage of the commercial power source occurs, power demand will be greater than that under a usual state where no power outage occurs. Accordingly, it is preferable to facilitate the power generation of the power generation unit at the time of the power outage. However, if the power generation unit deteriorates, it is difficult to generate power in a stable manner.

An object of the embodiment of this invention is therefore to overcome the foregoing disadvantage by providing a cogeneration apparatus having a power generation unit connected to a commercial power source that enables to facilitate power generation at the time of power outage, while estimating a degree of deterioration of the unit to determine whether power generation is capable.

In order to achieve the object, this invention provides in its first aspect a cogeneration apparatus having a power generation unit equipped with a power generator adapted to be connected to an AC power feed line at a location between a commercial power source and an electric load, and an internal combustion engine for driving the generator, comprising: a switch installed at a location between the power generation unit and an outage power output to be connected to the electric load at outage of the commercial power source; a total engine operation time period calculator that calculates a total operation time period of the engine; an outage occurrence determiner that determines whether the outage of the commercial power source occurs; a cooperative power generation controller that opens the switch to combine the power generation unit with the commercial power source to supply combined power to the electric load, if the calculated total operation time period of the engine is equal to or smaller than a predetermined first time period when the outage is determined not to occur; a power generation capability determiner that estimates a degree of deterioration of the power generation unit and determines whether the power generation unit is capable of generating power based on the estimated degree of deterioration of the power generation unit when the outage is determined to occur; and an outage power generation controller that closes the switch to connect the power generation unit to the outage power output to supply the power generated by the power generation unit to the electric load, if the power generation unit is determined to be capable of generation power when the outage is determined to occur.

In order to achieve the object, this invention provides in its second aspect a cogeneration method having a power generation unit equipped with a power generator adapted to be connected to an AC power feed line at a location between a commercial power source and an electric load, and an internal combustion engine for driving the generator, and a switch installed at a location between the power generation unit and an outage power output to be connected to the electric load at outage of the commercial power source, comprising the steps of: calculating a total operation time period of the engine; determining whether the outage of the commercial power source occurs; opening the switch to combine the power generation unit with the commercial power source to supply combined power to the electric load, if the calculated total operation time period of the engine is equal to or smaller than a predetermined first time period when the outage is determined not to occur; estimating a degree of deterioration of the power generation unit and determining whether the power generation unit is capable of generating power based on the estimated degree of deterioration of the power generation unit when the outage is determined to occur; and closing the switch to connect the power generation unit to the outage power output to supply the power generated by the power generation unit to the electric load, if the power generation unit is determined to be capable of generation power when the outage is determined to occur.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A cogeneration apparatus according to an embodiment of the invention will now be explained with reference to the attached drawings.

Figure 1:
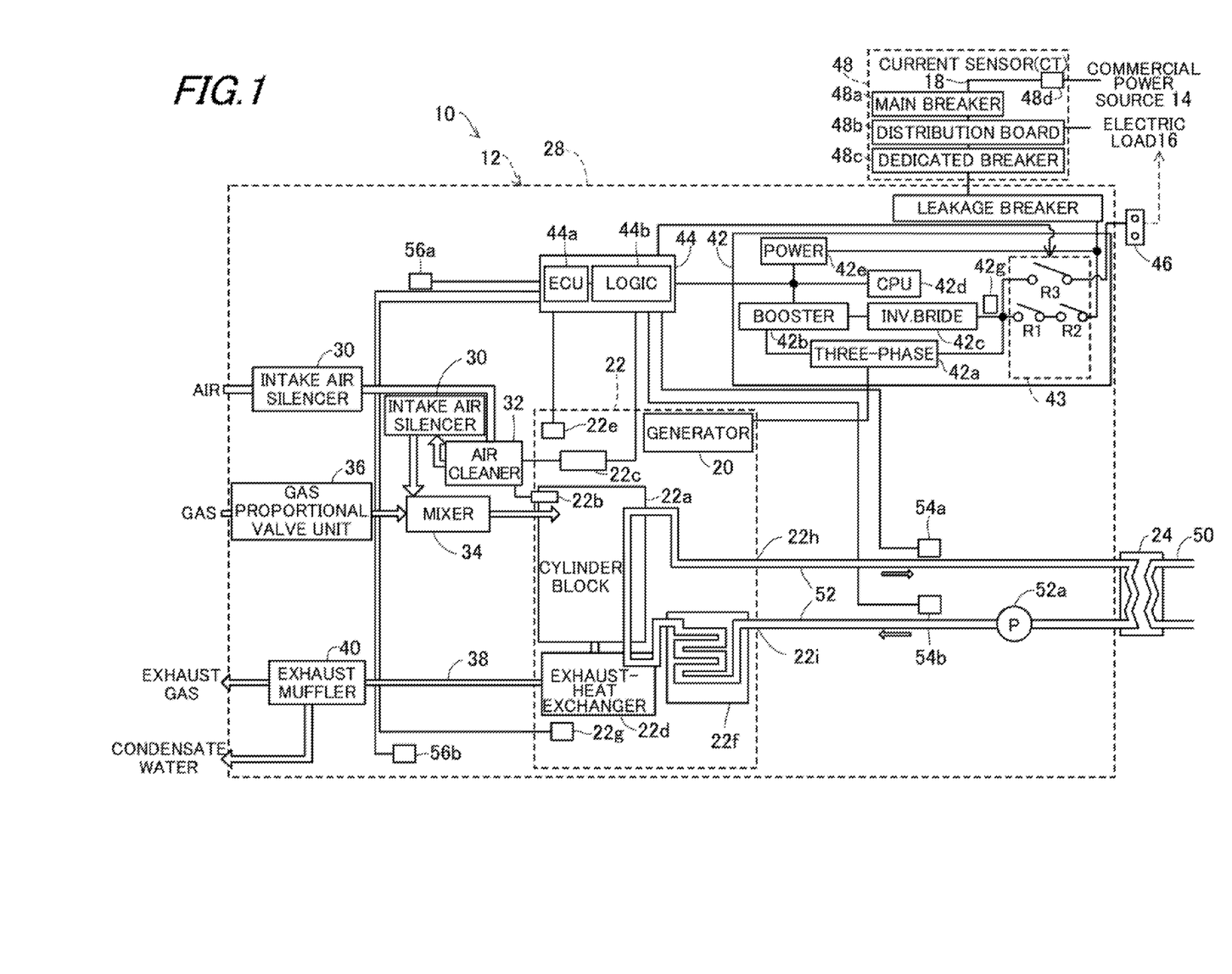
FIG. 1 is a block diagram showing an overall view of a cogeneration apparatus according to the embodiment of this invention.
Figure 2A:
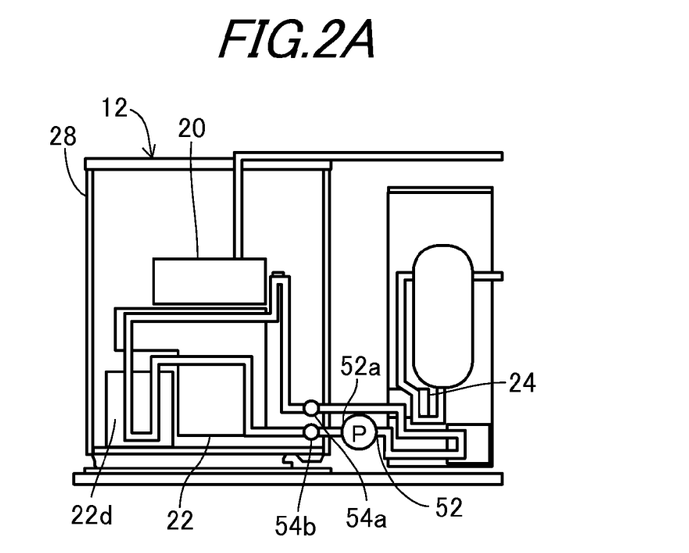
FIG. 2A is a schematic side view of the cogeneration apparatus shown in FIG. 1
Figure 2B:
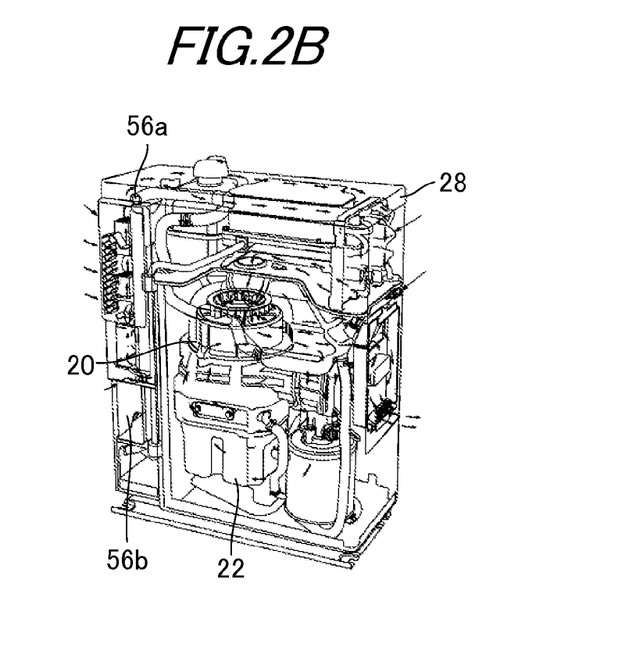
FIG. 2B is a perspective view of the power generation unit shown as a real machine.

FIG. 1 is a block diagram showing an overall view of a cogeneration apparatus according to the embodiment of this invention, FIG. 2A is a schematic side view of the cogeneration apparatus 10 shown in FIG. 1 and FIG. 2B is a perspective view of the power generation shown as a real machine.

In FIG. 1, reference numeral 10 designates the cogeneration apparatus. The cogeneration apparatus 10 is equipped with a power generation unit 12 having a power generator (alternator) 20 connected to an AC power feed line (power line) 18 between a commercial power source (commercial power network) 14 and an electric load (precisely, a lighting fixture, etc.) 16, an internal combustion engine (ENG; hereinafter called "engine") 22 for driving the power generator 20, and a heat exchanger 24 adapted to exchange heat with a cooling water of the engine 22.

The power generation unit 12 is integrally built and housed inside a power generation unit case 28. The commercial power source 14 outputs or generates single-phase, three-wire, 100/200 V, 50 Hz (or 60 Hz) AC (alternating current) power.

The engine 22 is a single-cylinder, four-cycle, water-cooled, spark-ignition, OHV engine that runs on the city gas or LP (liquefied petroleum) gas and has a displacement of, for example, 163 cc. Although not shown in the drawing, a cylinder head and a cylinder block 22a of the engine 22 is laid in the lateral (horizontal) direction in the case 28, and a piston is accommodated in the cylinder to reciprocate.

Air sucked from an air intake duct flows an intake air silencer 30 and an air cleaner 32 and flows into a mixer 34, where it is mixed with gas supplied through a gas proportional valve unit 36 from a gas (fuel) supply source (not shown). The air-fuel mixture produced in the mixer 34 flows into a combustion chamber (not shown).

A sparkplug 22b installed near the combustion chamber generates spark discharge between electrodes which face the combustion chamber to ignite and burn the air-fuel mixture when being supplied with an output of a battery (not shown) through an ignition device 22c having a power transistor, ignition coil and the like.

The exhaust gas thus generated exchanges heat with the engine cooling water at an exhaust heat exchanger 22d to cool the water and is discharged to the exterior of the generation unit case 28 through an exhaust pipe 38 and an exhaust muffler 40.

A voltage sensor 22e is provided at a sparkplug cord connecting the sparkplug 22b and the ignition device 22c, and produces an output or signal indicative of a spark voltage generated between electrodes of the sparkplug 22b.

An oil tank or oil pan 22f is formed below the cylinder block 22a of the engine 22 (the crank case not illustrated) for retaining lubricant oil (engine oil) of the engine 22. The lubricant oil is pumped up by a gear pump (not shown) to lubricate a moving or sliding portion of the piston or the like, and comes down along a connecting rod (not shown) or wall surface of the cylinder to be retained in the oil tank 22f.

A temperature sensor 22g is provided at an appropriate location of the cylinder block 22a of the engine 22 and produces an output or signal indicative of a temperature of the engine (lubricant) oil.

The power generator 20 is constituted as the multi-polar coils and is fastened on the crankcase of the engine 22 at a location within a flywheel (not shown) attached to the upper end of the crankshaft. The flywheel is fixed with magnet pieces at its inner surface. The power generator 20 produces AC, when rotating relatively to the flywheel. The power generator 20 functions as a starter motor for cranking the engine 22, when supplied with power from the commercial power source 14 (or the battery).

The output of the power generator 20 is sent to an inverter unit 42 where it is inverted to 100/200V AC power (single phase). The inverter unit 42 has a three-phase bridge circuit 42a that rectifies the AC power outputted from the power generator 20 to a DC power, a booster 42b that boosts the DC power outputted from the three-phase bridge circuit 42a to a predetermined voltage level, an inverter bridge circuit 42c that inverts the boosted DC power to an AC power, a CPU 42d that controls operation of the circuits 42a, 42b, 42c, a power source 42e for supplying an operating power to the CPU 42d.

The inverter unit 42 is connected to a switch 43 that switches a destination of the output of the inverter bridge circuit 42c and a controller 44 that controls operation of the power generation unit 12.

The controller 44 controls operation of the switch 43, and the switch 43 selects the destination of the AC power inverted at the inverter bridge circuit 42c between the commercial power source 14 and an outage power output 46 (plug socket used at the time of outage of the commercial power source 14) connected to the electric load 16.

A voltage sensor 42g is provided at a location of the inverter unit 42 and produces an output or signal indicative of a voltage at a location between the power generator 12 and the outage power output 46, more precisely at a location between the inverter bridge circuit 42c and the switch 43 provided at a position before (at an upstream side in the current flow) the outage power output 46.

Figure 3:
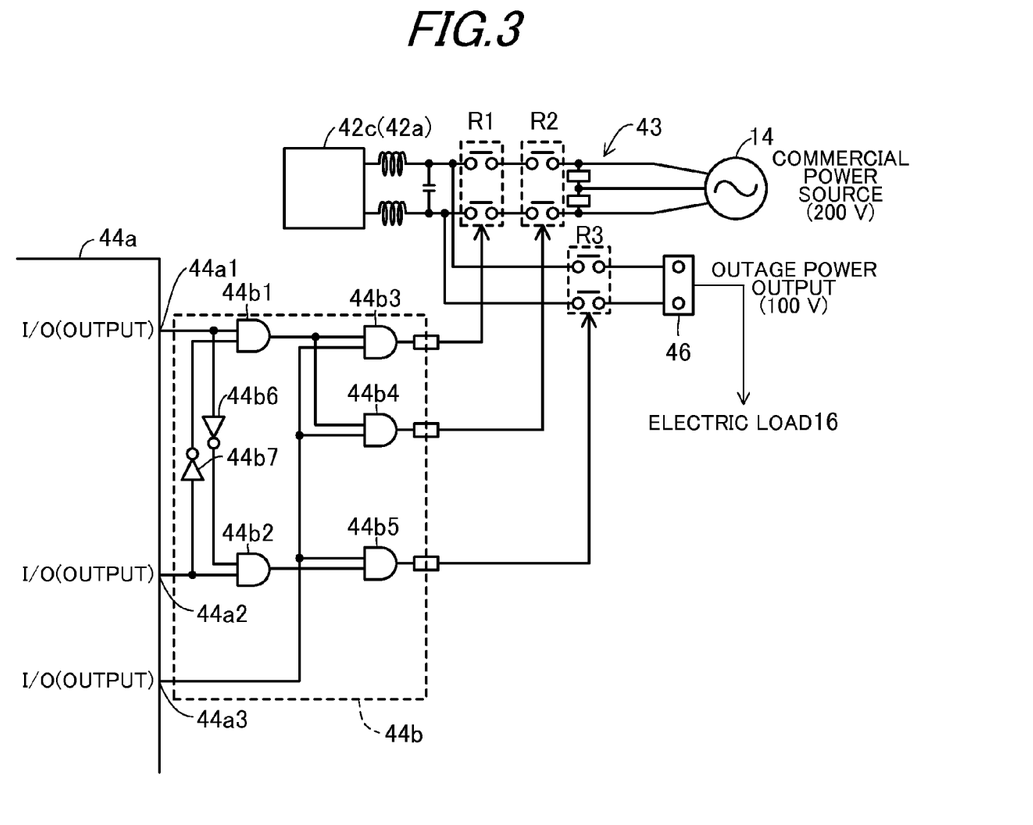
FIG. 3 is a block diagram showing a detailed configuration of a switch and controller shown in FIG. 1.

FIG. 3 is a block diagram showing a detailed configuration of the switch 43 and the controller 44.

As illustrated, the switch 43 comprises three relays R1, R2, R3. Specifically, it comprises the relays R1 and R2 installed at a location between the commercial power source 14 and the inverter bridge circuit 42c (and the three-phase bridge circuit 42a), the relay R3 installed at a location between the inverter bridge circuit 42c (and the three-phase bridge circuit 42a) and the outage power output 46.

The controller 44 has an electronic control unit (ECU) 44a constituted as a microcomputer having a CPU, ROM, RAM, I/O, counters and an indicator, and a logic circuit 44b comprising five AND circuits 44b1, 44b2, 44b3, 44b4, 44b5 and two INV circuits 44b6, 44b7. The operation (ON or OFF) of the relays R1, R2, R3 can be controlled by changing the signal sent from the ECU 44a to the logic circuit 44b, since the logic circuit 44b connects the ECU 44a to the relays R1, R2, R3.

Specifically, an I/O output terminal 44a1 is connected to the AND circuit 44b1 directly and to the AND circuit 44b2 through an inverter circuit 44b6. An I/O output terminal 44a2 is connected to the AND circuit 44b2 directly and to the AND circuit 44b1 through an inverter circuit 44b7. The And circuit 44b1 is connected to the AND circuit 44b3 and AND circuit 44b4, while the AND circuit 44b2 is connected to the AND circuit 44b5. An I/O output terminal 44a3 is connected the AND circuits 44b3, 44b4, 44b5.

The relays R1, R2, R3 are made ON (closed) when a Hi level signal is inputted. Specifically, when the I/O output terminal 44a1 outputs a Hi (high level) signal and the I/O output terminal 44a2 outputs a Lo (low level) signal which is inverted to a Hi signal by the inverter circuit 44b7, the AND circuit 44b1 outputs a Hi signal.

At that time, when the I/O output terminal 44a3 outputs a High signal to the AND circuits 44b3, 44b4, the AND circuits 44b3, 44b4 outputs a High signal. With this, the relays R1, R2 are made ON (closed).

In this instance, since the AND circuit 44b2 outputs a Lo signal, the AND circuits 44b5 is inputted with a Hi signal and Lo signal and outputs a Lo signal. With this, the relay R3 is made OFF (opened).

On the other hand, when the I/O output terminal 44a1 outputs a Lo signal and the I/O output terminals 44a2, 44a3 output Hi signals, since the AND circuits 44b3, 44b4 are inputted with Lo signals, they output Lo signals to make the relays R1, R2 OFF. Since, however, the AND circuit 44b5 is inputted with Hi signals, it outputs a Hi signal to make the relay R3 ON (closed).

The AND circuit 44b2 is configured to be an interlock circuit which prevents the relays R1, R2, R3 from being made ON simultaneously for fail-safe.

Returning to the explanation of FIG. 1, the inverter unit 42 is connected to an indoor switchboard (distributing board) 48, The switchboard 48 includes a main breaker 48a that prevents over-current and the like, a distribution board 48b that adds power from the power source 14 to the combined output of the inverter units 42 and supplies it to the electric load 16, a dedicated breaker 48c of the generation unit 12, a current sensor (power demand detector) 48d that is installed in the power feed line 18 between the power source 14 and the main breaker 48a to produce an output or signal indicative of AC power current flowing therethrough, and other elements.

The heat exchanger 24 exchanges heat between tap water flowing a circulation channel 50 at the side of a hot water tank (not shown) and cooling water of the engine 22 flowing a circulation channel 52 at the side of the power generation unit 12 and heat the tap water. Specifically, the circulation channels 50, 52 are partially made close to each other to form the heat exchanger 24 such that the tap water is heated, while the cooling water is cooled through the heat exchange with the tap water.

The circulation channel 52 connects the engine 22 and the heat exchanger 24. Specifically, the channel 52 is connected to a cooling water outlet 22h of the engine 22 at one end and is connected to a cooling water inlet 22i at the other end of the engine 22 in such a manner that the cooling water passing the cylinder block 22a of the engine 22 and heated there flows the channel 52, is cooled at the heat exchanger 24 by the tap water and is returned to the engine 22. A pump 52a is installed a the channel 52 for circulating the cooling water.

A first temperature sensor 54a is installed at a location upstream of the heat exchanger 24 and produces an output or signal indicative of a temperature T1 of the cooling water outputted from the outlet 22h of the engine 22. A second temperature sensor 54b is installed at a location downstream of the heat exchanger 24 and produces an output or signal indicative of a temperature T2 of the cooling water returned to the inlet 22i of the engine 22. The term "upstream" and "downstream" mean those in the direction of water flow.

As shown in FIG. 2B, a third temperature sensor 56a is installed at a location above the power generator 20 in the direction of gravity in the power generation unit case 28 and produces an output or signal indicative of a temperature T3 in the case 28. A fourth temperature sensor 56b is installed at a location below the power generator in that direction in the case 28 and produces an output or signal indicative of a temperature T4 in the case 28.

The outputs of the first to fourth temperature sensors 54a, 54b, 56a, 56b are sent to the ECU 44a of the controller 44.

Figure 4:
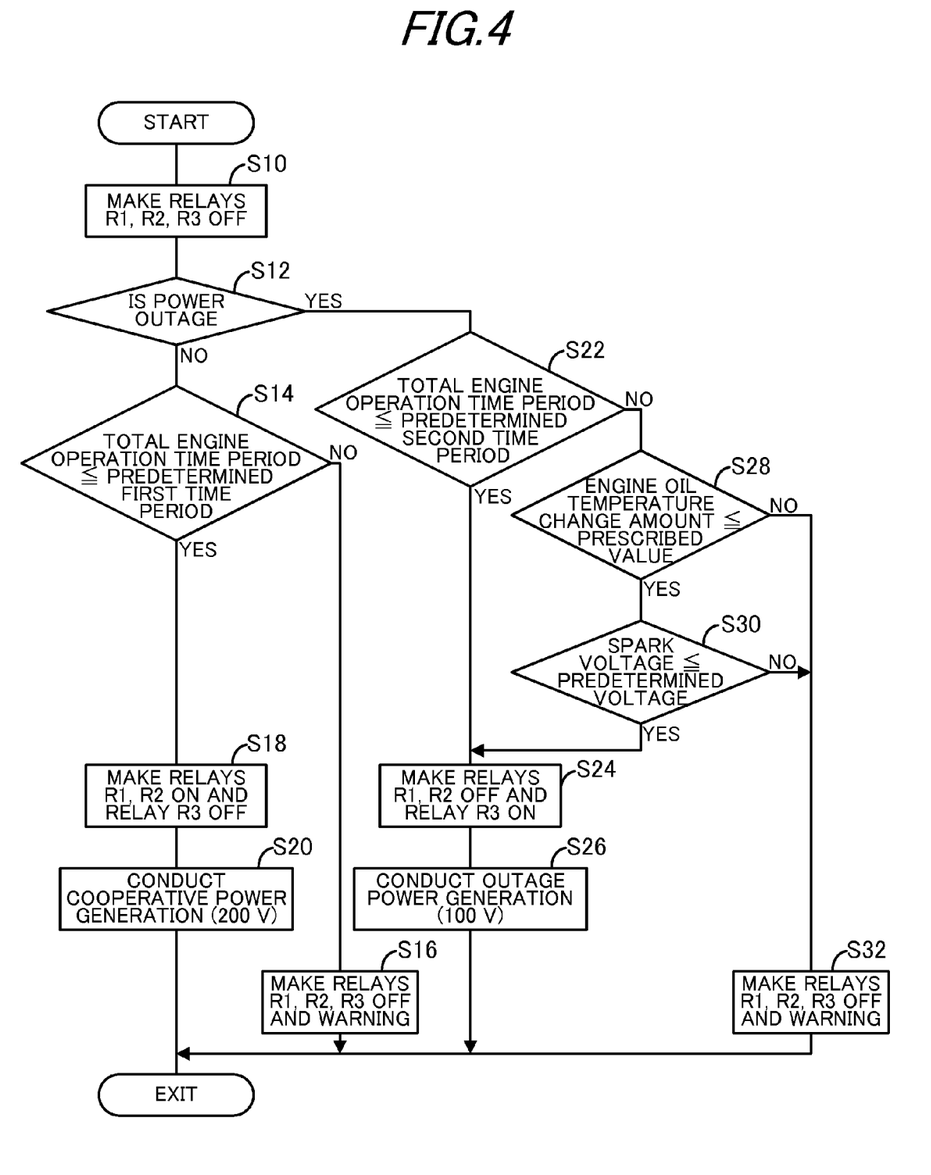
FIG. 4 is a flowchart showing the operation of the controller shown in FIG. 1.

FIG. 4 is a flowchart showing the operation of the controller 44 of the cogeneration apparatus 10. The program is executed at predetermined intervals, e.g., 100 milliseconds.

Explaining this, the program begins in S10, in which all of the relays R1, R2, R3 are made OFF and the program proceeds to S12, in which it is determined whether the commercial power source 14 is at power outage (black-out). This is done based on the output of the current sensor 48d installed in the power feed line 18 between the power source 14 and the main breaker 48a.

To be more specific, it is determined that the power source 14 is normal if the signal outputted from the current sensor 48d is equal to or greater than a threshold value indicative of the commercial power, while it is determined that outage occurs if the sensor output is smaller than the threshold value.

When the result is negative in S12, the program proceeds to S14, in which it is determined whether a total operation time period of the engine 22 is equal to or smaller than a predetermined first time period. The total operation time period of the engine 22 means a time period obtained by accumulating every operation time period since installation of the apparatus 10 or since last maintenance or repair thereof.

The reason why it is determined whether the total engine operation time period is not more than the predetermined first time period is that deterioration of the engine 22 progresses with increasing total operation time period. The predetermined first time period thus functions as an index to determine or estimate the degree of deterioration of the apparatus 10, and is set to be 6000 hours, for example. This time period is set with a margin taking manufacturing variance or safety of the apparatus 10 into account.

When the result in S14 is negative, i.e., when it is determined that the total engine operation time period exceeds the predetermined first time period, the program proceeds to S16, in which the relays R1, R2, R3 are made OFF to interrupt or cut the connection between the power generator 20 (and inverter unit 42) and the commercial power source 14, and a prescribed warning message to remind the operator to make maintenance of the engine 22, etc. is displayed in the aforesaid indicator. If the relays have been made OFF in S10, they should be kept as they are.

When the result in S14 is affirmative, the program proceeds to S18, in which a Hi signal is outputted respectively from the I/O output terminal 44a1, 44a3, while a Lo signal is outputted from the I/O output terminal 44a2 to make the relays R1, R2 ON (and to make the relay R3 OFF, i.e., to make the switch 43 OFF). If the relay R3 has been made OFF in S10, it should be kept as it is. The program then proceeds to S20, in which the cooperative (combined) power generation of 200 V is conducted at the inverter unit 42.

On the other hand, when the result in S12 is affirmative, i.e., when it is determined that the commercial power source 14 is at power outage, the program proceeds to S22, in which it is determined whether the total operation time period of the engine 22 is equal to or smaller than a predetermined second time period.

The predetermined second time period is also an index to determine or estimate the degree of deterioration of the apparatus 10, and is set to be longer than the predetermined first time period, e.g., 7000 hours, so as to mitigate or alleviate the condition of power generation at outage than that at a no-outage situation to facilitate the power generation at outage, as will be explained later.

When the result in S22 is affirmative, the program proceeds to S24, in which a Lo signal is outputted from the I/O output terminal 44a1, while a Hi signal is outputted respectively from the I/O output terminal 44a2, 44a3 to make the relays R1, R2 OFF (and to make the relay R3 ON, i.e., to make the switch 43 ON), and proceeds to S26, in which the outage power generation of 100 V is conducted at the inverter unit 42.

When the result in S22 is negative, i.e., when it is determined that the total engine operation time period exceeds the predetermined second time period, the program proceeds to S28, in which it is determined whether a change amount (change rate) of the engine oil (lubricant oil) temperature (more correctly, the temperature of the lubricant oil) of the engine 22 per unit time, an increase rate of the engine oil temperature is equal to or smaller than a prescribed value (e.g., 3° C./sec). The increase rate of the engine oil temperature is calculated from the output of the temperature sensor 22g.

When the result in S28 is affirmative, the program proceeds to S30, in which a spark voltage between the electrodes of the sparkplug 22b is detected by the voltage sensor 42g and it is determined whether the detected spark voltage is equal to or smaller than a predetermined voltage (e.g., 80 kV).

When the result in S30 is affirmative, the program proceeds to S24, in which a Lo signal is outputted from the I/O output terminal 44a1, while a Hi signal is outputted respectively from the I/O output terminal 44a2, 44a3 to make the relays R1, R2 OFF and the relay R3 ON, and proceeds to S26, in which the outage power generation of 100 V is conducted at the inverter unit 42.

When the result in S28 is negative, i.e., when it is determined that the increase rate of the engine oil temperature exceeds the prescribed value, it can be guessed deterioration or degradation of the engine oil advances. Similarly, when the result in S30 is negative, i.e., when it is determined that the spark voltage exceeds the predetermined voltage, it can be guessed that deterioration of the sparkplug 22b, for example widening of sparkplug gap, advances.

Accordingly, when the result in S28 or S30 is negative, the program proceeds to S32, in which the relays R1, R2, R3 are made OFF to interrupt or cut the connection between the inverter unit 42 and the power generation output 46 to cease the outage power generation, and a prescribed warning message to remind the operator to make maintenance of the engine 22, etc. is displayed in the aforesaid indicator.

It should be noted in the above that processing in S28, S30 is alternative and either can be deleted.

Thus, since the cogeneration apparatus 10 of the first embodiment is configured as mentioned above, it becomes possible to surely supply the generated power when the outage is determined not to occur since the power generation is determined based on the comparison of the total engine operation time period to the predetermined first time period, and to facilitate the power generation when the outage is determined to occur since the total engine operation time period is no longer compared to the predetermined first time period to determine the power generation.

In addition, since the degree of deterioration of the power generation unit 12 is estimated and the power generation capability of the unit 12 is determined based on the estimated degree of deterioration, it becomes possible to supply power generation at the time of outage where power generation is more required.

Further, it becomes possible to facilitate the power generation at the time of outage since the total engine operation time period is not compared to the predetermined first time period, but is compared to the predetermined second time period set to be longer than the predetermined first time period.

Furthermore, since the degree of deterioration of the power generation unit 12 is estimated from the total engine operation time period, or the change amount of the lubricant oil temperature, or the spark voltage, it becomes possible to estimate the degree more appropriately and to determine the capability of the power generation unit 12 more properly.

Figure 5:
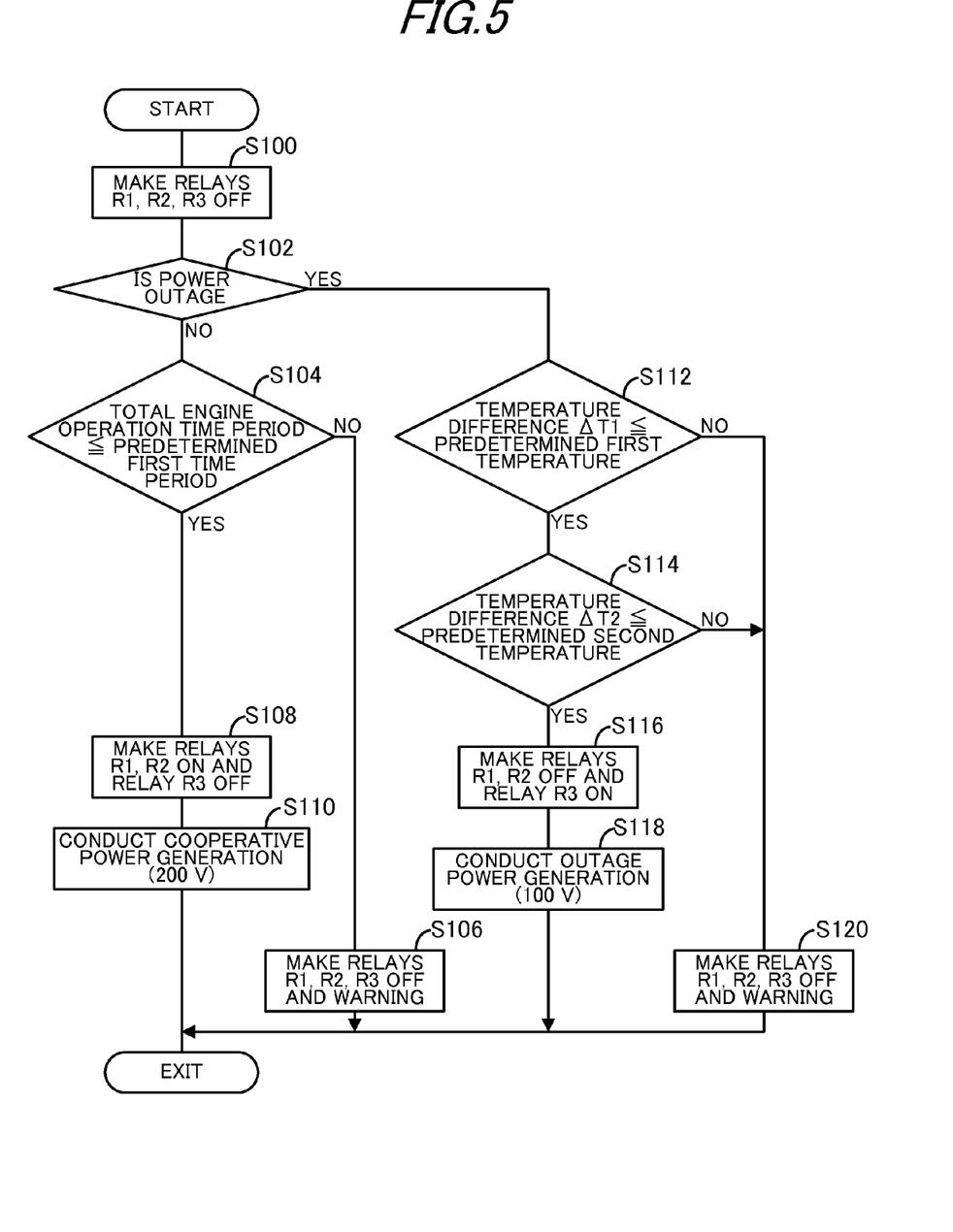
FIG. 5 is a flowchart showing the operation of the controller according to the second embodiment of the invention.

FIG. 5 is a flowchart, similar to FIG. 4, but showing the operation of the controller 44 of the cogeneration apparatus 10 according to the second embodiment of the invention. The program is also executed at predetermined intervals, e.g., 100 milliseconds.

Following processing in steps from S100 to S106 in the same manner as S10 to S16, the program proceeds to S112, when the result in S102 is affirmative, i.e., when it is determined that the commercial power source 14 is at power outage. In S112, the temperature T1 of the cooling water heated by the engine 22 to be supplied to the heat exchanger 24 is detected from the output of the temperature sensor 54a, the temperature T2 of the cooling water cooled by the heat exchanger 24 to be returned to the engine 22 is detected from the output of the temperature sensor 54b, a temperature difference ΔT1 between the temperatures T1 and T2 is calculated, and it is determined whether the temperature difference ΔT1 is equal to or smaller than a predetermined first temperature, e.g., 15° C.

Explaining with reference to FIG. 2A, the temperature T1 of the cooling water heated by the engine 22 to be supplied to the heat exchanger 24 is detected by the temperature sensor 54a installed at the circulation channel 52, and the temperature T2 of the cooling water cooled by the heat exchanger 24 to be returned to the engine 22 is detected by the temperature sensor 54b installed at the channel 52.

From the fact that the temperature difference ΔT1 is equal to or smaller than the predetermined first temperature, it can be judged that the cooling water of the engine 22 has been normally circulated and the pump 52a for circulating the cooling water has been normally operated just before the outage happens and hence the cooling performance of the engine 22 has not be lowered. Thus, it becomes possible to determine the degree of engine cooling performance, i.e., the degree of deterioration of the pump 52a and the like, by determining whether the temperature difference ΔT1 is equal to or smaller than the predetermined first temperature.

Returning to the explanation of FIG. 5, when the result in S112 is affirmative, the program proceeds to S114, in which the temperature T3 at a location above the power generator 20 in the direction of the gravity in the power generation unit case 28 is detected from the output of the temperature sensor 56a, the temperature T4 at a location below the power generator 20 in that direction in the case 28 is detected from the output of the temperature sensor 56b, and a temperature difference ΔT2 between the temperatures T3 and T4 is calculated. In S114, it is then determined whether the temperature difference ΔT2 is equal to or smaller than a predetermined second temperature, e.g., 10° C.

Here, as shown in FIG. 2B, the temperatures sensor 56a is situated at a location above the power generator 20 in the direction of the gravity in the power generation unit case 28, while the temperature sensor 56b is situated at a location below the power generator 20 in that direction in the case 28, and the temperatures T3 and T4 are detected by these sensors 56a and 56b.

From the fact that the temperature difference ΔT2 is equal to or smaller than the predetermined second temperature, it can be judged that a ventilation passage in the power generation unit case 28 has been secured without problem and the ventilation performance has been sufficient just before the outage happens. Thus, it becomes possible to determine the degree of ventilation performance, i.e., the degree of deterioration of the pump and the like, by determining whether the temperature difference ΔT2 is equal to or smaller than the predetermined second temperature.

Returning to the explanation of FIG. 5, when the result in S114 is affirmative, the program proceeds to S116, in which a Lo signal is outputted from the I/O output terminal 44a1, while a Hi signal is outputted respectively from the I/O output terminal 44a2, 44a3 to make the relays R1, R2 OFF and the relay R3 ON, and proceeds to S118, in which the outage power generation of 100 V is conducted at the inverter unit 42.

When the result in S112 is negative, i.e., when it is determined that the temperature difference ΔT1 exceeds the predetermined first temperature, it can be judged that the engine cooling performance deteriorates or degrades. Similarly, when the result in S114 is negative, i.e., when it is determined that the temperature difference ΔT2 exceeds the predetermined second temperature, it can be judged that the in-case ventilation performance deteriorates or degrades.

Accordingly, when the result in S112 or S114 is negative, the program proceeds to S120, in which the relays R1, R2, R3 are made OFF to interrupt or cut the connection between the inverter unit 42 and the power generation output 46 to cease the outage power generation, and a prescribed warning message to remind the operator to make maintenance of the engine 22, etc. is displayed in the aforesaid indicator.

It should be noted in the above that processing in S112, S114 is alternative and either can be deleted.

Thus, since the cogeneration apparatus 10 in the second embodiment is configured as mentioned above, it becomes possible to facilitate the power generation at the time of outage since the total engine operation time period is no longer compared to the predetermined first time period to determine the power generation. In addition, since the degree of deterioration of the power generation unit 12 is estimated from the cooling water temperature difference or the in-case temperature difference, it becomes possible to estimate the degree more appropriately and to determine the capability of power generation of the unit 12 more properly.

Figure 6:
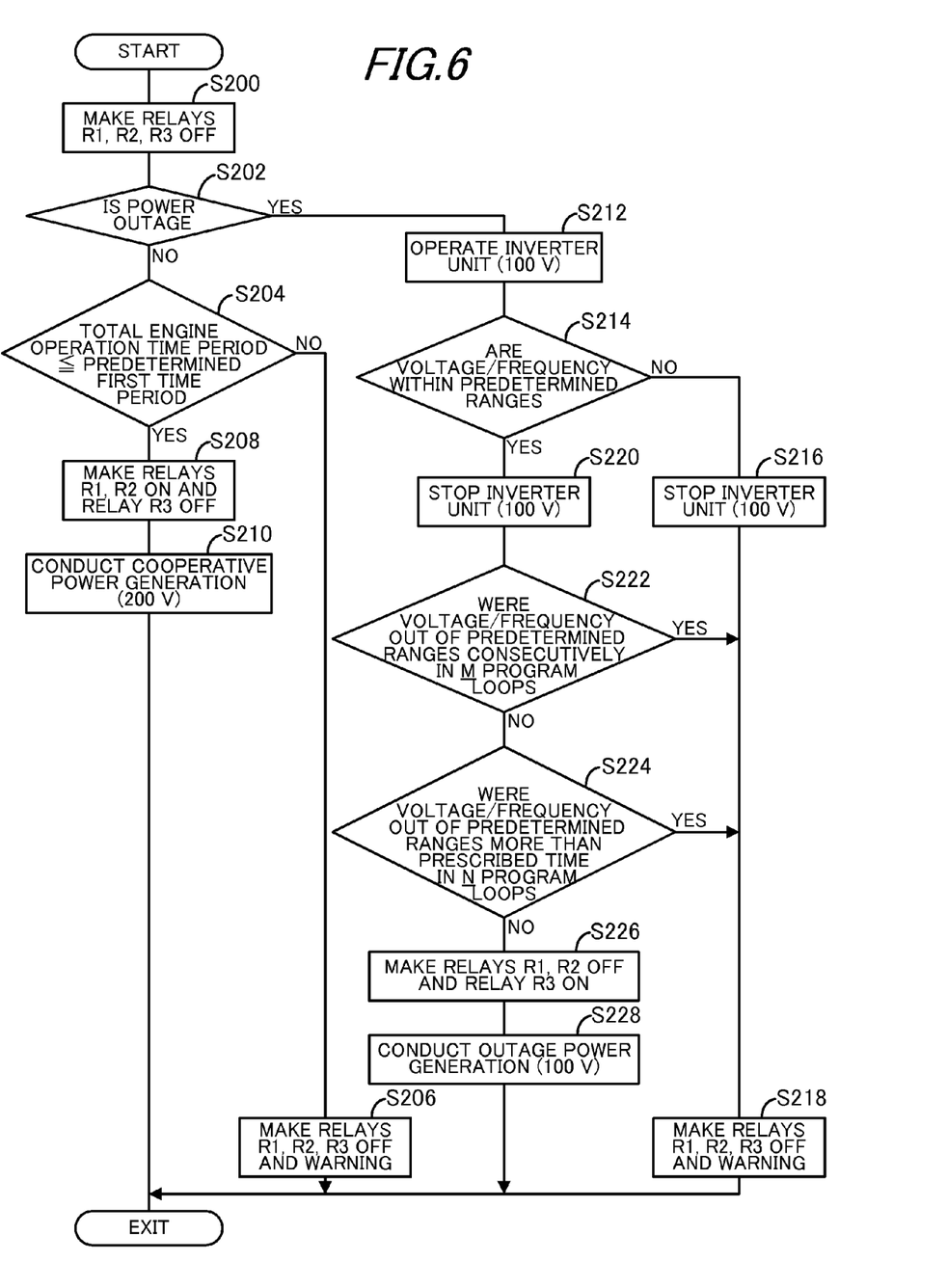
FIG. 6 is a flowchart showing the operation of the controller according to the third embodiment of the invention.

FIG. 6 is a flowchart, similar to FIG. 4, but showing the operation of the controller 44 of the cogeneration apparatus 10 according to the third embodiment of the invention. The program is also executed at predetermined intervals, e.g., 100 milliseconds.

Following processing in steps from S200 to S210 in the same manner as S10 to S20, the program proceeds to S212, when the result in S202 is affirmative, i.e., when it is determined that the commercial power source 14 is at power outage. In S212, the inverter unit 42 is operated to output 100 V.

The program next proceeds to S214, in which the voltage and frequency at a position before the switch 43 installed at a position before the inverter bridge circuit 42c and the power generation output 46 (at the side upstream in the current flow) are detected from the output of the voltage sensor 42g, and it is determined whether the detected voltage and frequency are within predetermined ranges, more precisely it is determined whether the detected voltage is within the range of, for example, 100 V to 110 V, and whether the detected frequency is within the range of, for example, 45 Hz to 65 Hz.

When the result in S214 is negative, the program proceeds to S216, in which the inverter unit 42 is stopped not to output 100 V, and to S218, in which the relays R1, R2, R3 are made OFF to interrupt or cut the connection between the inverter unit 42 and the power generation output 46 to cease the outage power generation, and a prescribed warning message to remind the operator to make maintenance of the engine 22, etc. is displayed in the aforesaid indicator.

On the other hand, when the result in S214 is affirmative, the program proceeds to S220, in which the inverter unit 42 is stopped, and to S222, in which the event that the detected voltage and frequency were out of the predetermined ranges happened before in the preceding program loops consecutively by m (program loop) times or more.

When the result in S222 is affirmative, since the possibility that the event would happen is considered to be large although the event has not happened at this program loop, the program proceeds to S218.

On the other hand, when the result in S222 is negative, the program proceeds to S224, in which the number of time(s) in which the event that the detected voltage and frequency were out of the predetermined ranges happened is equal to or larger than a prescribed number of time(s) (e.g., five) in preceding n program loop times.

When the result in S224 is affirmative, the program proceeds to S218 for the same reason as that in S222.

On the other hand, when the result in S224 is negative, the program proceeds to S226, in which a Lo signal is outputted from the I/O output terminal 44a1, while a Hi signal is outputted respectively from the I/O output terminal 44a2, 44a3 to make the relays R1, R2 OFF and the relay R3 ON, and proceeds to S228, in which the inverter unit 42 is again operated and the outage power generation of 100 V is conducted at the inverter unit 42.

It should be noted that in the above-mentioned S214 either the detected voltage or frequency can be judged, and that S222 and/or S224 can be deleted.

Thus, since the cogeneration apparatus 10 in the third embodiment is configured as mention above, it becomes possible to facilitate the power generation at the time of outage since the total engine operation time period is no longer compared to the predetermined first time period to determine the power generation. In addition, since the degree of deterioration of the power generation unit 12 is estimated from the voltage or frequency of generated power, it becomes possible to estimate the degree more appropriately and to determine the capability of power generation of the unit 12 more properly.

As stated above, the first to third embodiments are configured to have a cogeneration apparatus (10) or method having a power generation unit (12) equipped with a power generator (20) adapted to be connected to an AC power feed line (18) at a location between a commercial power source (14) and an electric load (16) and an internal combustion engine (22) for driving the generator, characterized by: a switch (43) installed at a location between the power generation unit (12) and an outage power output (46) to be connected to the electric load (16) at outage of the commercial power source (14); a total engine operation time period calculator (ECU 44a, S14, S104, S204) that calculates a total operation time period of the engine (22); an outage occurrence determiner (ECU 44a, S12, S102, S202) that determines whether the outage of the commercial power source (14) occurs; a cooperative power generation controller (ECU 44a, S14, S18-S20, S104, S108-S110, S204, S208-S210) that opens the switch (43) to combine the power generation unit (12) with the commercial power source (14) to supply combined (cooperative) power to the electric load (16), if the calculated total operation time period of the engine (22) is equal to or smaller than a predetermined first time period when the outage is determined not to occur; a power generation capability determiner (ECU 44a, S22, S28, S30, S112, S114, S214, S222, S224) that estimates a degree of deterioration of the power generation unit (12) and determines whether the power generation unit (12) is capable of generating power based on the estimated degree of deterioration of the power generation unit (12) when the outage is determined to occur; and an outage power generation controller (ECU 44a, S24-S26, S116-S118, S226-S228) that closes the switch (43) to connect the power generation unit (12) to the outage power output (46) to supply the power generated by the power generation unit (12) to the electric load (16), if the power generation unit (12) is determined to be capable of generation power when the outage is determined to occur.

With this, it becomes possible to surely supply the generated power when the outage is determined not to occur since the power generation is determined based on the comparison of the total engine operation time period to the predetermined first time period, and to facilitate the power generation when the outage is determined to occur since the total engine operation time period is no longer compared to the predetermined first time period to determine the power generation. In addition, since the degree of deterioration of the power generation unit 12 is estimated and the power generation capability of the unit 12 is determined based on the estimated degree of deterioration of the power generation unit 12, it becomes possible to supply power generation at the time of outage where power generation is more required.

In the apparatus or method in the first embodiment, the power generation capability determiner (ECU 44a, S22) estimates the degree of deterioration based on the calculated total operation time period of the engine 22 and determines that the power generation unit 12 is capable of generating power when the calculated total operation time period of the engine 22 is equal to or smaller than a predetermined second time period that is set to be larger than the predetermined first time period.

With this, in addition to the effects mentioned above, it becomes possible to facilitate the power generation at the time of outage since the total engine operation time period is not compared to the predetermined first time period, but is compared to the predetermined second time period set to be longer than the predetermined first time period. In addition, since the degree of deterioration of the power generation unit 12 is estimated from the total engine operation time period, it becomes possible to estimate the degree more appropriately and to determine the capability of the power generation unit 12 more properly.

In the apparatus or method in the first embodiment, the power generation capability determiner (ECU 44a, S22, S28) estimates the degree of deterioration based on a calculated change amount per unit time of a lubricant oil temperature of the engine 22 and determines that the power generation unit 12 is capable of generating power when the calculated change amount is equal to or smaller than a predetermined value even if the calculated total operation time period of the engine 22 exceeds the predetermined second time period.

With this, in addition to the effects mentioned above, it becomes possible to facilitate the power generation at the time of outage since the total engine operation time period is no longer compared to the predetermined first time period to determine the power generation. In addition, since the degree of deterioration of the power generation unit 12 is estimated from the change amount of the lubricant oil temperature of the engine 22, it becomes possible to estimate the degree more appropriately and to determine the capability of power generation of the unit 12 more properly.

In the apparatus or method in the first embodiment, the power generation capability determiner (ECU 44a, S22, S30) estimates the degree of deterioration based on a detected spark voltage between electrodes of a sparkplug of the engine (22) and determines that the power generation unit (12) is capable of generating power when the detected spark voltage is equal to or smaller than a predetermined voltage even if the calculated total operation time period of the engine (22) exceeds the predetermined second time period.

With this, in addition to the effects mentioned above, it becomes possible to facilitate the power generation at the time of outage since the total engine operation time period is no longer compared to the predetermined first time period to determine the power generation. In addition, since the degree of deterioration of the power generation unit 12 is estimated from the spark voltage of the engine 22, it becomes possible to estimate the degree more appropriately and to determine the capability of power generation of the unit 12 more properly.

In the apparatus or method in the second embodiment, the power generation capability determiner (ECU 44a, S112) estimates the degree of deterioration based on a calculated cooling water temperature difference $\Delta T1$ between a temperature of cooling water heated by the engine 22 to be supplied to a heat exchanger 24 and a temperature of the cooling water cooled by the heat exchanger 24 to be returned to the engine 22 and determines that the power generation unit 12 is capable of generating power when the calculated cooling water temperature difference is equal to or smaller than a predetermined first temperature.

With this, in addition to the effects mentioned above, it becomes possible to facilitate the power generation at the time of outage since the total engine operation time period is no longer compared to the predetermined first time period to determine the power generation. In addition, since the degree of deterioration of the power generation unit 12 is estimated from the cooling water temperature difference, it becomes possible to estimate the degree more appropriately and to determine the capability of power generation of the unit 12 more properly.

In the apparatus or method in the second embodiment, the power generation capability determiner (ECU 44a, S114) estimates the degree of deterioration based on a calculated in-case temperature difference $\Delta T2$ between a temperature at a location above the power generator (20) and a temperature at a location below the power generator (20) in direction of gravity in a case (28) housing the power generator (20) and determines that the power generation unit (12) is capable of generating power when the calculated in-case temperature difference is equal to or smaller than a predetermined second temperature.

With this, in addition to the effects mentioned above, it becomes possible to facilitate the power generation at the time of outage since the total engine operation time period is no longer compared to the predetermined first time period to determine the power generation. In addition, since the degree of deterioration of the power generation unit 12 is estimated from the in-case temperature difference, it becomes possible to estimate the degree more appropriately and to determine the capability of power generation of the unit 12 more properly.

In the apparatus or method in the third embodiment, the power generation capability determiner (ECU 44a, S214, S222, S224) estimates the degree of deterioration based on a detected voltage of generated power at a position before the switch (43) and determines that the power generation unit (12) is capable of generating power when the detected voltage is within a predetermined range.

With this, in addition to the effects mentioned above, it becomes possible to facilitate the power generation at the time of outage since the total engine operation time period is no longer compared to the predetermined first time period to determine the power generation. In addition, since the degree of deterioration of the power generation unit 12 is estimated from the voltage of generated power, it becomes possible to estimate the degree more appropriately and to determine the capability of power generation of the unit 12 more properly.

In the apparatus or method in the third embodiment, the power generation capability determiner (ECU 44*a*, S214, S222, S224) estimates the degree of deterioration based on a detected frequency of generated power at a position before the switch (43) and determines that the power generation unit (12) is capable of generating power when the detected frequency is within a prescribed range.

With this, in addition to the effects mentioned above, it becomes possible to facilitate the power generation at the time of outage since the total engine operation time period is no longer compared to the predetermined first time period to determine the power generation. In addition, since the degree of deterioration of the power generation unit 12 is estimated from the frequency of generated power, it becomes possible to estimate the degree more appropriately and to determine the capability of power generation of the unit 12 more properly.

In the apparatus or method in the third embodiment, the power generation capability determiner (ECU 44*a*, S222) estimates the degree of deterioration based on a counted number of times in which at least one of the detected voltage and frequency of generated power is out of the predetermined range concerned and determines that the power generation unit (12) is capable of generating power when the counted number is less than a predetermined value.

With this, in addition to the effects mentioned above, it becomes possible to facilitate the power generation at the time of outage since the total engine operation time period is no longer compared to the predetermined first time period to determine the power generation. In addition, since the degree of deterioration of the power generation unit 12 is estimated from the past event on the voltage/frequency of generated power, it becomes possible to estimate the degree more appropriately and to determine the capability of power generation of the unit 12 more properly.

In the apparatus or method in the third embodiment, the power generation capability determiner (ECU 44*a*, S224) estimates the degree of deterioration based on a counted number of time(s) in which at least one of the detected voltage and frequency of generated power is out of the predetermined range concerned and determines that the power generation unit (12) is capable of generating power when the counted number is less than a prescribed number of time(s) in predetermined numbers of detection.

With this, in addition to the effects mentioned above, it becomes possible to facilitate the power generation at the time of outage since the total engine operation time period is no longer compared to the predetermined first time period to determine the power generation. In addition, since the degree of deterioration of the power generation unit 12 is estimated from the past event on the voltage/frequency of generated power, it becomes possible to estimate the degree more appropriately and to determine the capability of power generation of the unit 12 more properly.

It should be noted that, instead of a gas engine using gas fuel such as the city gas or LP gas exemplified as the power source of the power generator 20, it can be an engine using gasoline fuel or the like. Further, although the rated output of the power generation unit 26, displacement of the engine 22 and the like are shown by specific values, they are only examples and not limited thereto.

It should further be noted that specific value mentioned in the first to third embodiments are examples and should not be limited thereto.

Japanese Patent Application No. 2012-252733 filed on Nov. 16, 2012, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A cogeneration apparatus having a power generation unit equipped with a power generator adapted to be connected to an AC power feed line at a location between a commercial power source and an electric load and an internal combustion engine for driving the generator, comprising:

a switch installed at a location between the power generation unit and an outage power output to be connected to the electric load at outage of the commercial power source;

the power generation unit being adapted to be connected to the AC power feed line through the switch;

the switch disconnecting the power generation unit from the AC power feed line and connecting the power generation unit to the outage power output, disconnecting the power generation unit from the outage power output and connecting the power generation unit to the AC power feed line, or disconnecting the power generation unit from the AC power feed line and the outage power output;

a total engine operation time period calculator that calculates a total operation time period of the engine;

an outage occurrence determiner that determines whether the outage of the commercial power source occurs;

a power generation capability determiner that estimates a degree of deterioration of the power generation unit based on one of the calculated total operation time period of the engine, a calculated cooling water temperature difference between a temperature of cooling water heated by the engine to be supplied to a heat exchanger and a temperature of the cooling water cooled by the heat exchanger to be returned to the engine, a calculated in-case temperature difference between a temperature at a location above the power generator and a temperature at a location below the power generator in direction of gravity in a case housing the power generator, and a detected voltage of generated power at a position before the switch, and determines whether the power generation unit is capable of generating power based on the estimated degree of deterioration of the power generation unit when the outage is determined to occur; and a power generation controller that controls the switch to disconnect the power generation unit from the outage power output and to connect the power generation unit to the AC power feed line to supply combined power of the power generation unit and the commercial power source combined through the AC power feed line to the electric load through the AC power feed line, if the calculated total operation time period of the engine is equal to or smaller than a predetermined first time period when the outage is determined not to occur, and controls the switch to disconnect the power generation unit from the AC power feed line and to connect the power generation unit to the outage power output to supply the power generated by the power generation unit to the electric load through the outage power output, if the power generation unit is determined to be capable of generation power when the outage is determined to occur.

2. The apparatus according to claim 1, wherein the power generation capability determiner estimates the degree of deterioration based on the calculated total operation time period of the engine and determines that the power generation unit is capable of generating power when the calculated total operation time period of the engine is equal to or smaller than a predetermined second time period that is set to be larger than the predetermined first time period.

3. The apparatus according to claim 2, wherein the power generation capability determiner estimates the degree of deterioration based on a calculated change amount per unit time of a lubricant oil temperature of the engine and determines that the power generation unit is capable of generating power when the calculated change amount is equal to or smaller than a predetermined value even if the calculated total operation time period of the engine exceeds the predetermined second time period.

4. The apparatus according to claim 2, wherein the power generation capability determiner estimates the degree of deterioration based on a detected spark voltage between electrodes of a sparkplug of the engine and determines that the power generation unit is capable of generating power when the detected spark voltage is equal to or smaller than a predetermined voltage even if the calculated total operation time period of the engine exceeds the predetermined second time period.

5. The apparatus according to claim 1, wherein the power generation capability determiner estimates the degree of deterioration based on a calculated cooling water temperature difference between a temperature of cooling water heated by the engine to be supplied to a heat exchanger and a temperature of the cooling water cooled by the heat exchanger to be returned to the engine and determines that the power generation unit is capable of generating power when the calculated cooling water temperature difference is equal to or smaller than a predetermined first temperature.

6. The apparatus according to claim 1, wherein the power generation capability determiner estimates the degree of deterioration based on a calculated in-case temperature difference between a temperature at a location above the power generator and a temperature at a location below the power generator in direction of gravity in a case housing the power generator and determines that the power generation unit is capable of generating power when the calculated in-case temperature difference is equal to or smaller than a predetermined second temperature.

7. The apparatus according to claim 1, wherein the power generation capability determiner estimates the degree of deterioration based on a detected voltage of generated power at a position before the switch and determines that the power generation unit is capable of generating power when the detected voltage is within a predetermined range.

8. The apparatus according to claim 7, wherein the power generation capability determiner estimates the degree of deterioration based on a detected frequency of generated power at a position before the switch and determines that the power generation unit is capable of generating power when the detected frequency is within a prescribed range.

9. The apparatus according to claim 8, wherein the power generation capability determiner estimates the degree of deterioration based on a counted number of times in which at least one of the detected voltage and frequency of generated power is out of the predetermined range concerned and determines that the power generation unit is capable of generating power when the counted number is less than a predetermined value.

10. The apparatus according to claim 9, wherein the power generation capability determiner estimates the degree of deterioration based on a counted number of times in which at least one of the detected voltage and frequency of generated power is out of the predetermined range concerned and determines that the power generation unit is capable of generating power when the counted number is less than a prescribed number of times in predetermined number of detection.

11. A cogeneration method having a power generation unit equipped with a power generator adapted to be connected to an AC power feed line at a location between a commercial power source and an electric load and an internal combustion engine for driving the generator, and a switch installed at a location between the power generation unit and an outage power output to be connected to the electric load at outage of the commercial power source, the power generation unit being adapted to be connected to the AC power feed line through the switch, the switch disconnecting the power generation unit from the AC power feed line and connecting the power generation unit to the outage power output, disconnecting the power generation unit from the outage power output and connecting the power generation unit to the AC power feed line, or disconnecting the power generation unit from the AC power feed line and the outage power output, comprising the steps of calculating a total operation time period of the engine;

determining whether the outage of the commercial power source occurs;

estimating a degree of deterioration of the power generation unit based on one of the calculated total operation time period of the engine, a calculated cooling water temperature difference between a temperature of cooling water heated by the engine to be supplied to a heat exchanger and a temperature of the cooling water cooled by the heat exchanger to be returned to the engine, a calculated in-case temperature difference between a temperature at a location above the power generator and a temperature at a location below the power generator in direction of gravity in a case housing the power generator, and a detected voltage of generated power at a position before the switch, and determining whether the power generation unit is capable of generating power based on the estimated degree of deterioration of the power generation unit when the outage is determined to occur; and controlling the switch to disconnect the power generation unit from the outage power output and to connect the power generation unit to the AC power feed line to supply combined power of the power generation unit and the commercial power source combined through the AC power feed line to the electric load through the AC power feed line, if the calculated total operation time period of the engine is equal to or smaller than a predetermined first time period when the outage is determined not to occur, and controlling the switch to disconnect the power generation unit from the AC power feed line and to connect the power generation unit to the outage power output to supply the power generated by the power generation unit to the electric load through the outage power output, if the power generation unit is determined to be capable of generation power when the outage is determined to occur.

12. The method according to claim 11, wherein the step of power generation capability determining estimates the degree of deterioration based on the calculated total operation time period of the engine and determines that the power generation unit is capable of generating power when the calculated total operation time period of the engine is equal to or smaller than a predetermined second time period that is set to be larger than the predetermined first time period.

13. The method according to claim 12, wherein the step of power generation capability determining estimates the degree of deterioration based on a calculated change amount per unit time of a lubricant oil temperature of the engine and determines that the power generation unit is capable of generating power when the calculated change amount is equal to or smaller than a predetermined value even if the calculated total operation time period of the engine exceeds the predetermined second time period.

14. The method according to claim 12, wherein the step of power generation capability determining estimates the degree of deterioration based on a detected spark voltage between electrodes of a sparkplug of the engine and determines that the power generation unit is capable of generating power when the detected spark voltage is equal to or smaller than a predetermined voltage even if the calculated total operation time period of the engine exceeds the predetermined second time period.

15. The method according to claim 11, wherein the step of power generation capability determining estimates the degree of deterioration based on a calculated cooling water temperature difference between a temperature of cooling water heated by the engine to be supplied to a heat exchanger and a temperature of the cooling water cooled by the heat exchanger to be returned to the engine and determines that the power generation unit is capable of generating power when the calculated cooling water temperature difference is equal to or smaller than a predetermined first temperature.

16. The method according to claim 11, wherein the step of power generation capability determining estimates the degree of deterioration based on a calculated in-case temperature difference between a temperature at a location above the power generator and a temperature at a location below the power generator in direction of gravity in a case housing the power generator and determines that the power generation unit is capable of generating power when the calculated in-case temperature difference is equal to or smaller than a predetermined second temperature.

17. The method according to claim 11, wherein the step of power generation capability determining estimates the degree of deterioration based on a detected voltage of generated power at a position before the switch and determines that the power generation unit is capable of generating power when the detected voltage is within a predetermined range.

18. The method according to claim 17, wherein the step of power generation capability determining estimates the degree of deterioration based on a detected frequency of generated power at a position before the switch and determines that the power generation unit is capable of generating power when the detected frequency is within a prescribed range.

19. The method according to claim 18, wherein the step of power generation capability determining estimates the degree of deterioration based on a counted number of times in which at least one of the detected voltage and frequency of generated power is out of the predetermined range concerned and determines that the power generation unit is capable of generating power when the counted number is less than a predetermined value.

20. The method according to claim 19, wherein the step of power generation capability determining estimates the degree of deterioration based on a counted number of times in which at least one of the detected voltage and frequency of generated power is out of the predetermined range concerned and determines that the power generation unit is capable of generating power when the counted number is less than a prescribed number of times in predetermined numbers of detection.

* * * * *